United States Patent [19]

Tateyama et al.

[11] Patent Number: 4,842,102
[45] Date of Patent: Jun. 27, 1989

[54] DISC BRAKE FOR WHEELED VEHICLE OR THE LIKE

[75] Inventors: Masayuki Tateyama, Ome; Ryuji Tsutsui, Kodaira, both of Japan

[73] Assignee: Nissan Motor Co., Ltd., Yokohama, Japan

[21] Appl. No.: 552,816

[22] Filed: Nov. 17, 1983

[30] Foreign Application Priority Data

Nov. 18, 1982 [JP] Japan .................................. 57-202394

[51] Int. Cl.⁴ ............................................... B62L 3/00
[52] U.S. Cl. .................... 188/24.21; 188/26; 188/72.6; 188/72.9; 188/71.7; 188/106 F; 188/196 M; 188/344
[58] Field of Search ...................... 188/24.21, 26, 72.9, 188/72.6, 72.5, 72.3, 71.7, 71.1, 24.21, 24.19, 196 M, 2 D, 1.11, 24.11, 24.12, 24.14, 24.15, 344, 361, 365, 106 F, 29

[56] References Cited

U.S. PATENT DOCUMENTS

| | | | |
|---|---|---|---|
| 1,959,049 | 5/1934 | Buus | 188/72.9 |
| 1,978,974 | 10/1934 | Williams | 188/71.7 |
| 3,465,849 | 9/1969 | Bernfeld et al. | 188/196 M X |
| 3,680,663 | 8/1972 | Kine | 188/72.9 X |
| 3,795,290 | 3/1974 | Hori et al. | 188/72.9 X |
| 4,236,608 | 12/1980 | Kobelt | 188/72.6 X |
| 4,374,552 | 2/1983 | Dayen | 188/72.9 |

FOREIGN PATENT DOCUMENTS

| | | | |
|---|---|---|---|
| 1180635 | 10/1964 | Fed. Rep. of Germany | 188/72.9 |
| 0388807 | 8/1908 | France | 188/344 |
| 55-49167 | 3/1980 | Japan . | |
| 0050593 | 3/1910 | Switzerland | 188/72.9 |

OTHER PUBLICATIONS

"Ki Kai Sei Kei," vol. 17, No. 4, pp. 19–27, Apr. 1973.

Primary Examiner—Douglas C. Butler
Attorney, Agent, or Firm—Foley & Lardner, Schwartz, Jeffery, Schwaab, Mack, Blumenthal & Evans

[57] ABSTRACT

A disc brake includes two pad supporting levers which are pivotally mounted on a single pivot. One of the levers has a first adjustment bolt which abuts the other lever to control the maximum clearance between the pads and a second which abuts the bracket on which the levers are pivotally mounted to control the clearance between one of the pads and the rotatable disc. A linkage which interconnects the levers induces same to rotate and clamp the pads against the rotatable disc by (a) a foot pedal controlled hydraulic servo integrated with the bracket and/or (b) a cable arrangement operatively connected with a hand brake.

14 Claims, 6 Drawing Sheets

DISC BRAKE FOR WHEELED VEHICLE OR THE LIKE

BACKGROUND OF THE INVENTION

1. Field of the Invention

The present invention relates generally to a disc brake and more specifically to a disc brake in which the clearance between the pads and the disc may be effectively minimized.

2. Description of the Prior Art

In a prior art arrangement shown in FIG. 1 of the drawings, it has been proposed to mount friction pad supporting levers, 1, 2 individually on a bracket 3 via pins 4, 5. In this arrangement the upper ends of the levers 1, 2 are interconnected by a linkage arrangement 6 which, as shown, is operated in response to the movement of an inner cable 7 of a Bowden cable 8.

However, this arrangement has suffered from the drawback that in order to prevent one of the pads from annoyingly dragging on the disc 9 when the brake is not applied, it is necessary to provide a relatively large clearance between the pads and the faces of the disc. Accordingly, a relatively large amount of inner cable travel is required to move the pads from their rest position into contact with the faces of the disc.

SUMMARY OF THE INVENTION

It is an object of the present invention to provide a disc brake arrangement which enables the clearance between the pads and the disc to be minimized without an undesirable "dragging" phenomenon taking place.

More specifically, the present invention takes the form of a disc brake for a vehicle which comprises: a rotatable disc, a mounting bracket fixedly secured to a chassis of the vehicle, a first lever pivotally mounted on the mounting bracket in a manner to be pivotal about an axis, a second lever pivotally mounted on the mounting bracket so as to be pivotal about the same axis, the first and second levers having thereon first and second brake pads respectively, a linkage interconnecting the first and second levers for inducing in response to a manual command, the first and second levers to rotate in opposite rotational directions about the axis and in a manner to clamp the pads against the opposite faces of the disc, a first clearance adjustment device projecting from the first lever toward the second lever, the first clearance adjustment device being arranged to engage the second lever in a manner to limit the clearance which occurs between the first and second pads in the absence of the command signal, and a second clearance adjustment device projecting from the first lever toward the mounting bracket, the second clearance adjustment device being arranged to engage the mounting bracket in a manner to limit the clearance which occurs between the disc and the first pad in the absence of the command signal.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
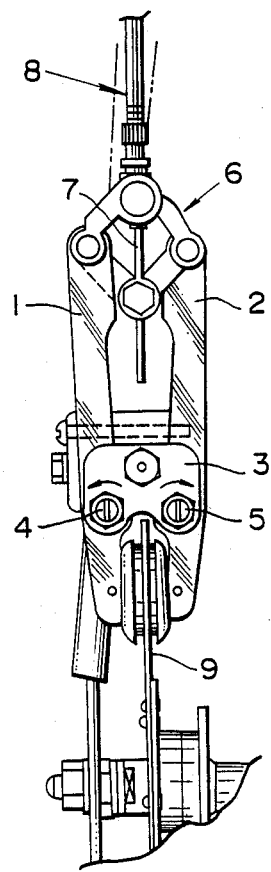
FIG. 1 is an elevational view of the prior art disc brake arrangement discussed briefly in the opening paragraphs of the present invention.
Figure 2:
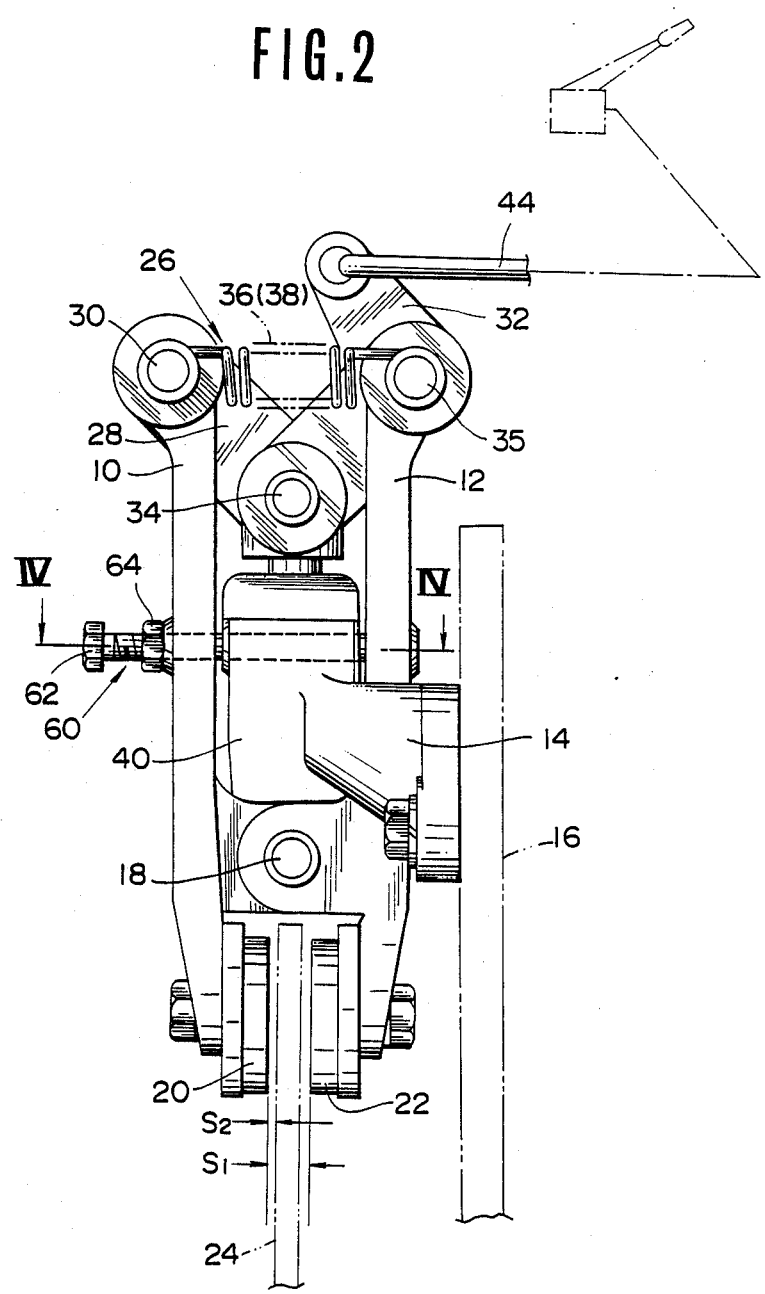
FIG. 2 is a front elevational view of a first embodiment of the present invention.
Figure 3:
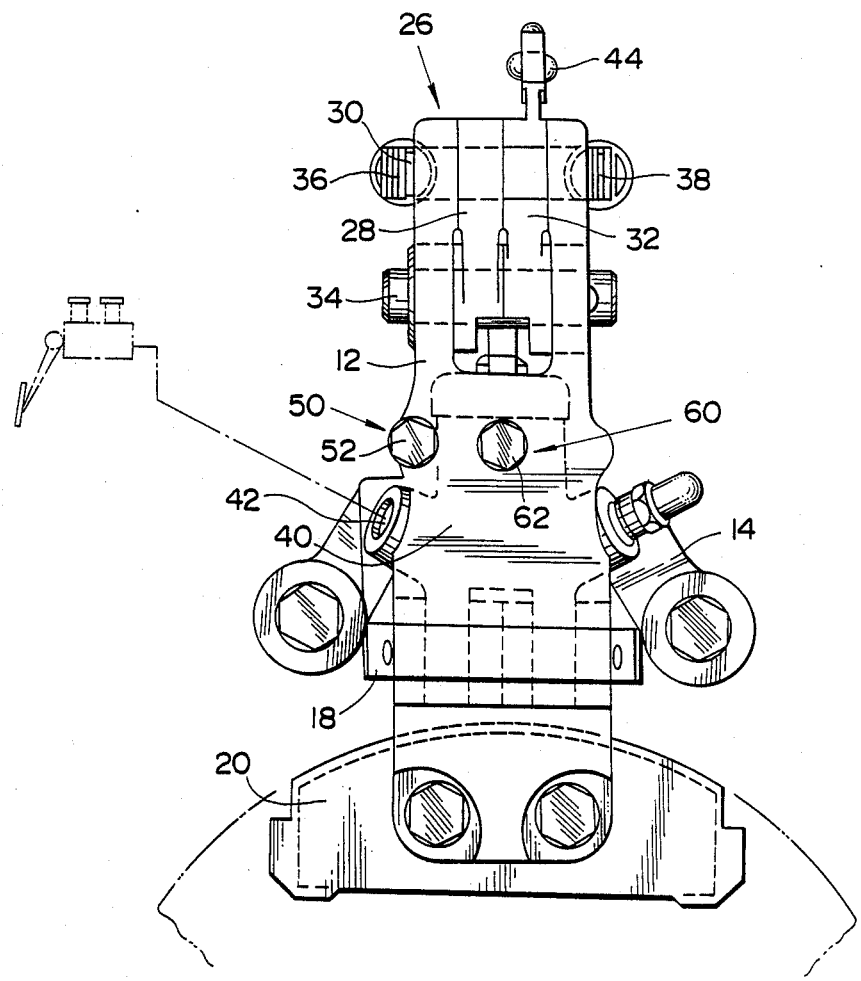
FIG. 3 is a side elevation of the embodiment shown in FIG. 2.

FIGS. 2 and 3 show in elevation a first embodiment of the present invention. In this arrangement, first and second levers 10, 12 are pivotally mounted on a bracket 14 fixedly connected to a chassis 16 (viz., of a vehicle or the like). As shown, the two levers 10, 12 are pivotally mounted on the same pin 18 so as to be pivotal about the same axis. Brake pads 20, 22 are detachably connected to the lower (as seen in the drawings) ends of the levers 10, 12 in a manner to be clamped against the opposite faces of a disc or brake rotor 24, upon rotation of the levers 10, 12 in opposite rotational directions about the afore-mention pin 18.

The upper ends of the levers 10, 12 are interconnected by a linkage arrangement generally denoted by the numeral 26. This linkage, as shown, takes the form of a link 28 pivotally connected at one end to the upper end of the first lever 10 by a pin 30 and a bell-crank lever 32 pivotally mounted on the top of the second lever 12, via pin 34. The link 28 and the bell crank lever 32 are pivotally connected by a pin 35.

The pins 30, 34 which serve to pivotally mount the link 28 and the lever 32 also serve in this arrangement as means for mounting a pair of springs 36, 38 between the tops of the levers 10, 12. These spring 36, 38 apply a bias to rotate the levers in a manner to hold the pads 20, 22 out of engagement with the faces of the disc 24.

A hydraulic cylinder or servo 40 is integrated with the bracket 14 in which the pivot pin 18 is disposed. This cylinder contains a piston (not shown) which is operatively connected with the pivot pin 34. The cylinder is fluidly connectable with a source of hydraulic fluid such as a foot operated master cylinder (by way of example only) via port 42. With this arrangement, upon the hydraulic fluid in the hydraulic cylinder being pressurized by the operation of the master cylinder, the piston is forced to drive the pivot pin 34 upwardly (as shown in the drawings) to induce the spreading of the upper ends of the levers 10, 12 and the consequent application of the friction pads 20, 22 against the faces of the disc 24.

The top of the bell-crank lever 32 is connected, as shown, with a cable or rod arrangement 44 operatively connected with a hand brake (or the like). With this arrangement application of the hand brake induces the bell crank lever 32 to rotate clockwise about the pin 34 and thus induce the spreading of the tops of the levers 10, 12 in a manner to apply the pads 20, 22 against the disc 24.

Figure 4:
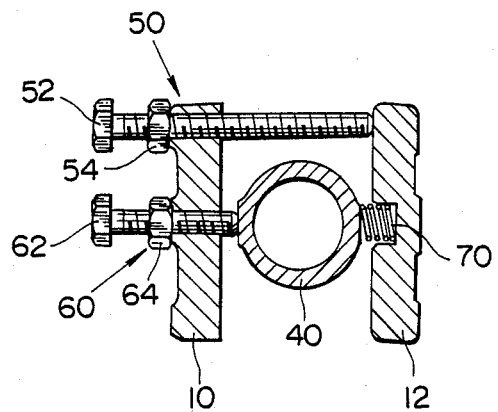
FIG. 4 is a sectional view taken along section line IV—IV of FIG. 2.

As best seen in FIG. 4 the first embodiment is provided with a first clearance adjustment device 50 which in this case takes the form of a bolt or screw 52 which threadedly mounted though the first lever 10 so as to project toward the second lever 12 in a manner to limit the degree by which the portions of the two levers located above the pivot pin 18 may approach each other and hence the degree by which the friction pads 20, 22 may separate (c.f. clearance $S_1$) from one and other. The bolt 52 is provided with a lock-nut 54.

A second clearance adjustment device 60 in the form of a second bolt or screw 62 is provided. In this case the bolt 62 is adapted to abut a portion of the bracket 14 in which the hydraulic cylinder 40 is formed in a manner to control the clearance $S_2$ between the pad 20 and the disc 24. This bolt has a lock-nut 64.

Interposed between the second lever 12 and the hydraulic cylinder 40 at a location essentially coaxial with the second adjustment bolt 62, is a spring 70. This spring resists the rotation of the first and second levers 10, 12 as a whole in a counter clockwise direction (as seen in FIG. 2) about the single axis and thus prevents pad 20 from undesirably dragging on the disc when the brake is not applied. That is to say, the spring 70 resiliently holds the arrangement against movement which is not prevented by the second adjustment bolt 62 abutting the hydraulic cylinder.

Accordingly, with the above disclosed arrangement, as the total clearance $S_1$ may be adjusted using the first clearance adjustment device 50 and the clearance between the brake pad 20 and the disc 24 may be controlled via the use of the second clearance adjustment device 60, it will be understood that the clearance between each of the pads and the disc can be adjusted. Viz., by firstly adjusting the clearance between the pad 10 and the disc 24 using the second clearance adjusting bolt 62, the clearance between the pad 22 and the disc 24 may be subsequently adjusted using the first clearance adjusting bolt 52. Further, as previously mentioned, as the bolt 62 and the spring 70 hold the levers and linkage arrangement in place and prevent any tendancy for the clearances between the pads 20, 22 and the disc 24 to vary due to one pad approaching the disc while the other moves away therefrom, (viz., the lever/linkage unit rotating as a whole) any dragging phenomenon is prevented while permitting small clearances between the pads 20, 22 and the disc.

Figure 5:
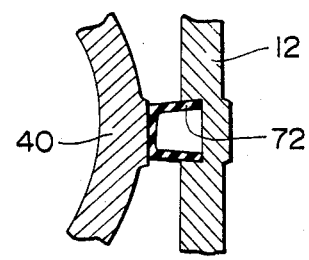
FIG. 5 is a sectional view of a second embodiment of the present invention wherein the spring shown in FIG. 4 is replaced with an elastomeric member.

FIG. 5 shows a second embodiment of the present invention wherein the spring 70 is replaced with a suitable elastomeric member 72 having the desired resilient properties.

Figure 6:
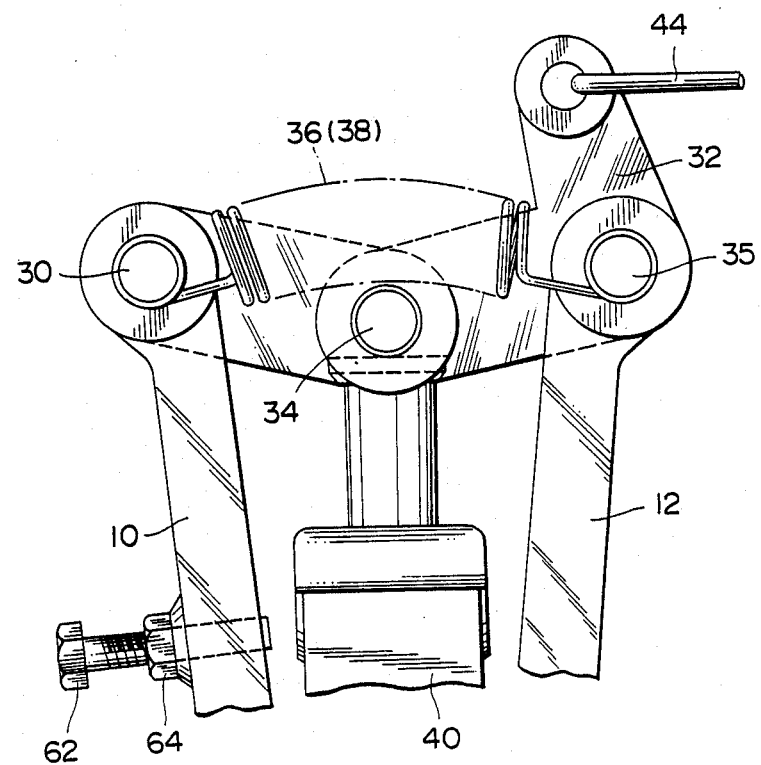
FIG. 6 is a partial front elevation of the arrangements shown in FIGS. 2 and 3 illustrating a feature via which excessive brake pad wear may be recognized.

A further feature possible with the present invention comes in the provision of means for indicating excessive brake pad wear. This arrangement takes the form of arranging the pivot pin 34 or a part of the linkage 26 in the path of the springs 20, 22 so that upon a predetermined amount of upward movement of the pin 36 being required to apply the brakes, the springs are engaged as shown in FIG. 6. With this arrangement upon the pin 34 engaging the springs, 34, 36 the resistance to further upward movement will be resisted by the distortion of the springs thus increasing the force which must be manually applied to the brake pedal of the vehicle.

Figure 7:
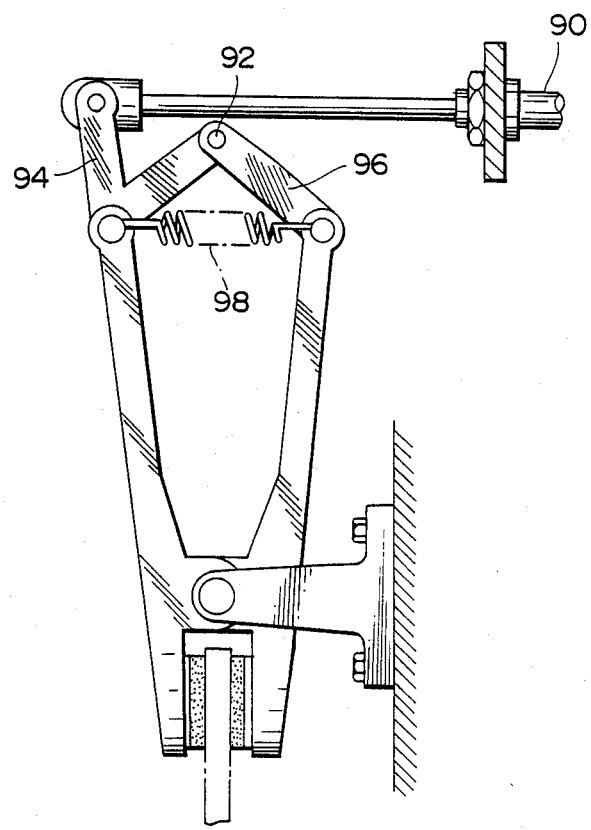
FIG. 7 is a front elevation of a simplified disc brake arrangement in which the brake wear indication feature is provided.

FIG. 7 shows a simplified arrangement wherein the above mentioned feature is included. In this arrangement the hydraulic cylinder is omitted and the levers interconnected by a Bowden cable 90. With this arrangement upon the pin 92 interconnecting the bell crank lever 94 and the link 96 decending (as seen in the drawings) to the point of engaging the spring (or springs) 98, the force required for further brake application will notably increase.

What is claimed is:

1. A disc brake for a vehicle comprising;
    a rotatable disc;
    a mounting bracket fixedly secured to a chassis of said vehicle;
    a first lever pivotally mounted on said mounting bracket in a manner to be pivotal about an axis;
    a second lever pivotally mounted on said mounting bracket so as to be pivotal about said axis,
    said first and second levers having thereon first and second brake pads immovably fixed thereto respectively;
    a linkage interconnecting said first and second levers for inducing in response to a manual command, said first and second levers to rotate in opposite rotational directions about said axis and in a manner to clamp said pads against the opposite faces of said disc;
    a first clearance adjustment device projecting from said first lever toward said second lever, said first clearance adjustment device being arranged to engage said second lever in a manner to limit the clearance which occurs between said first and second pads in the absence of said command signal; and
    a second clearance adjustment device projecting from said first lever toward said mounting bracket, said second clearance adjustment device being arranged to engage said mounting bracket in a manner to limit the clearance which occurs between said disc and said first pad in the absence of said command signal.

2. A disc brake as claimed in claim 1, further comprising first biasing means for biasing said first and second levers to rotate about said axis in a manner to move said first and second pads away from said disc.

3. A disc brake as claimed in claim 2, wherein said linkage takes the form of:
    link pivotally mounted at a first end on said first lever; and
    a bell crank lever pivotally mounted on said second lever, said bell crank lever being pivotally connected at one end thereof with a second end of said link, said bell crank lever and said link being arranged such that an acute angle defined therebetween increases in response to said command signal.

4. A disc brake as claimed in claim 3, wherein said biasing means take the form of a spring extending between pins on which said link and said bell crank lever respectively are pivotally mounted on said first and second levers.

5. In a wheeled vehicle,
    a disc operatively connected with a wheel of said vehicle for synchronous rotation therewith;
    a mounting bracket mounted on the chassis of said vehicle;
    a first lever pivotally mounted on said bracket at a point located between its first and second ends so as to be pivotal about an axis;
    a second lever pivotally mounted on said bracket at a point located between its first and second ends so as to be pivotable about said axis;
    a first brake pad immovably mounted on the second end of said first lever;

a second brake pad immovably mounted on the second end of said second lever;

a linkage interconnecting the first ends of said first and second levers;

a spring interconnecting the first ends of said first and second levers, said spring biasing said levers in a manner to hold said first and second brake pads out of contact with said disc;

means associated with said linkage means for inducing said linkage means to rotate said first and second levers in opposite rotational directions about said axis and against the bias of said spring to bring said first and second friction pads into contact with the opposite faces of said disc;

a first clearance adjustment bolt threadedly received in a first through hole formed in said first lever, said first clearance adjustment bolt being arranged to contact said second lever in a manner to limit the maximum clearance that can occur between said first and second friction pads;

a second clearance adjustment bolt threadedly received in a second through hold formed in said first lever, said second clearance adjustment bolt being arranged to contact said bracket in a manner to limit the clearance which occurs between said first brake pad and said disc; and a resilient member interposed between said second lever and said bracket, said resilient member and said second clearance adjustment bolt limiting the amount of rotation of said first and second levers as a unit about said axis.

6. A disc brake for a vehicle, comprising:

a rotatable disc;

a mounting bracket fixedly secured to a chassis of said vehicle;

a first lever pivotally mounted on said mounting bracket in a manner to be pivotal about an axis;

a second lever pivotally mounted on said mounting bracket so as to be pivotal about said axis;

said first and second levers having thereon first and second brake pads respectively;

a linkage interconnecting said first and second levers for inducing in response to a manual command, said first and second levers to rotate in opposite rotational directions about said axis and in a manner to clamp said pads against the opposite faces of said disc;

a first clearance adjustment device projecting from said first lever toward said second lever, said first clearance adjustment device being arranged to engage said second lever in a manner to limit the clearance which occurs between said first and second pads in the absence of said command signal; and a second clearance adjustment device projecting from said first lever toward said mounting bracket, said second clearance adjustment device being arranged to engage said mounting bracket in a manner to limit the clearance which occurs between said disc and said first pad in the absence of said command signal;

first biasing means for biasing said first and second levers to rotate about said axis in a manner to move said first and second pads away from said disc; and means for indicating a predetermined amount of wear of said first and second brake pads, said indicating means comprising said spring which extends between said pins and a portion of said linkage, said portion being arranged to be engageable with said spring when said first and second pads are worn beyond said predetermined limit and said manual command is present, the arrangement being such that upon said predetermined amount of wear occurring the engagement of said portion with said spring causes a sudden increase in the force required to apply said brake;

wherein said linkage includes a link pivotally mounted at a first end on said first lever, and a bell crank lever pivotally mounted on said second lever, said bell crank lever being pivotally connected at one end thereof with a second end of said link, said bell crank lever and said link being arranged such that an acute angle defined therebetween increases in response to said command signal; and wherein said biasing means includes a spring extending between pins on which said link and said bell crank lever respectively are pivotally mounted on said first and second levers.

7. A disc brake as claimed in claim 6, further comprising a servo device operatively interconnecting said linkage and said mounting bracket, said servo device produces a force in response to said command signal which induces said linkage to move said pads into contact with said disc.

8. A disc brake as claimed in claim 7, wherein said servo device takes the form of a hydraulic cylinder fluidly connected with a master cylinder, said hydraulic cylinder including a piston operatively connected with a pin which interconnects said second end of said link with said one end of said bell crank lever.

9. A disc brake as claimed in claim 6, further comprising resilient means interposed between said bracket and said second lever for resiliently resisting the movement of said second lever toward said bracket.

10. A disc brake as claimed in claim 9, wherein said resilient means is located essentially diametrically opposite of said first clearance adjustment device.

11. As disc brake as claimed in claim 9, wherein said resilient means takes the form of a spring mounted on one of said bracket and said second lever.

12. A disc brake as claimed in claim 9, wherein said resilient means takes the form of an elastomeric member mounted on one of said bracket and said second lever.

13. A disc brake as claimed in claim 6, wherein said first and second adjustment devices take the form of bolts threadedly received in through holes formed in said first lever, each of said bolts having a lock nut thereon.

14. A disc brake as claimed in claim 6, wherein said bell crank lever is operatively connected at a second end thereof to a hand brake device.

* * * * *